May 1, 1962 W. R. O'DAY 3,032,410
METHOD AND APPARATUS FOR THE DIRECT REDUCTION OF ORES
AND SUBSEQUENT FUSION IN A CONTINUOUS OPERATION
Filed Feb. 11, 1960 3 Sheets-Sheet 1

INVENTOR
William R. O'Day

BY *Wenderoth, Lind & Ponack*
ATTORNEYS

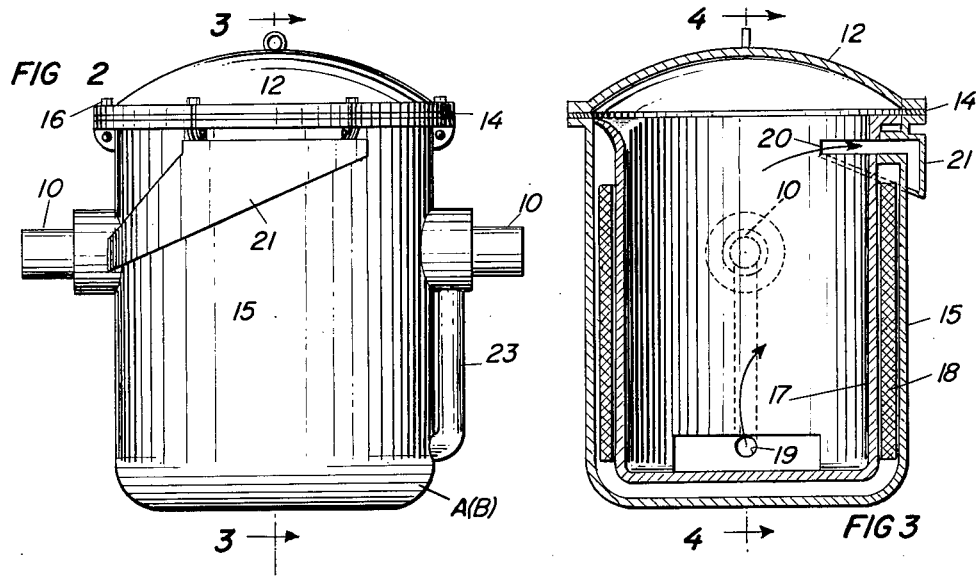
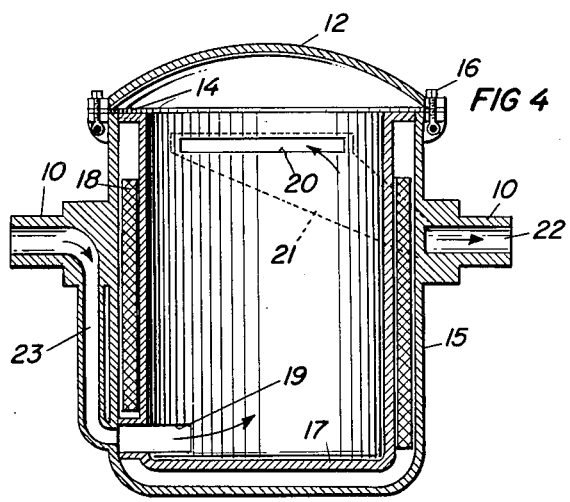

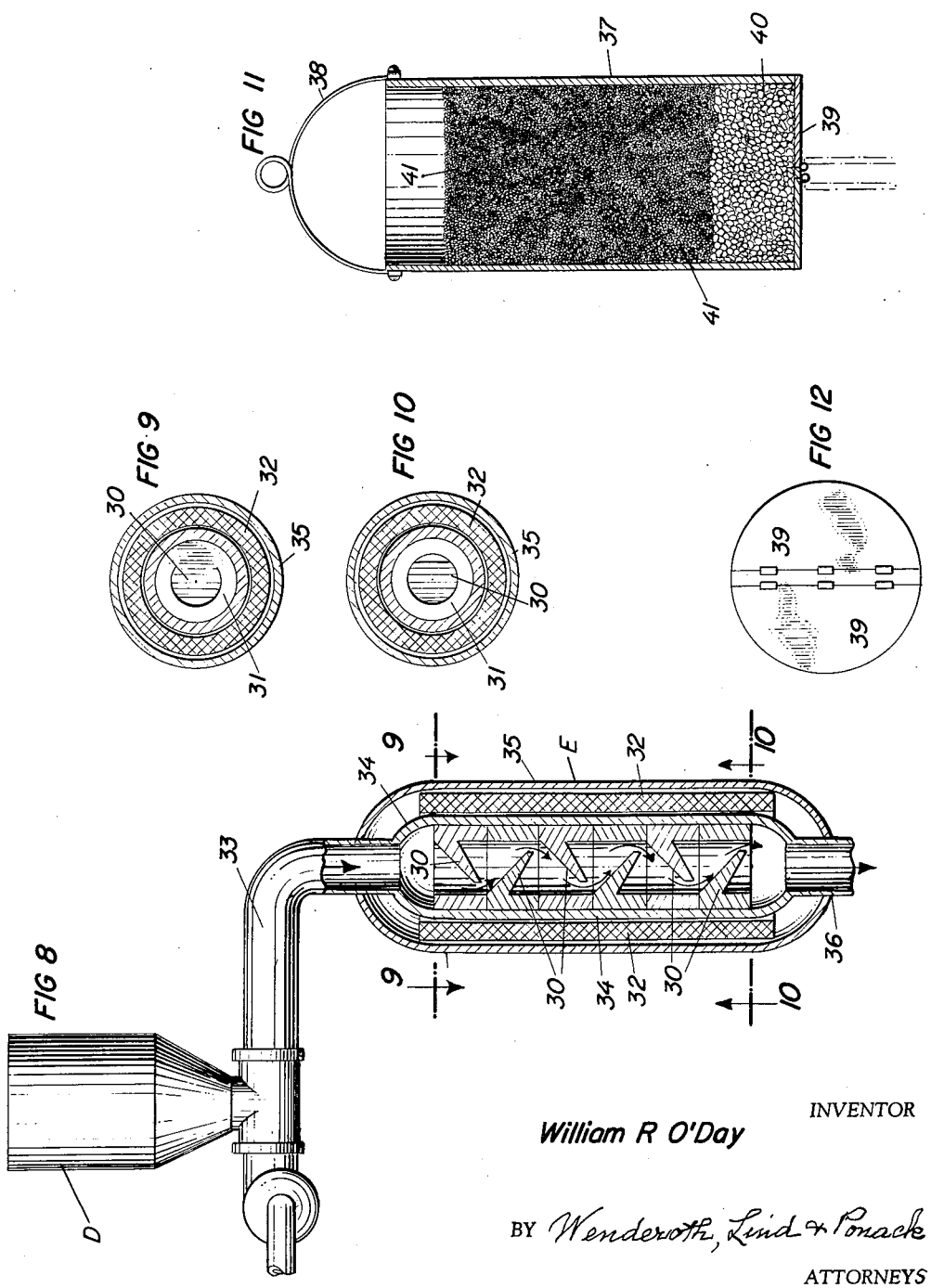

United States Patent Office 3,032,410
Patented May 1, 1962

3,032,410
METHOD AND APPARATUS FOR THE DIRECT REDUCTION OF ORES AND SUBSEQUENT FUSION IN A CONTINUOUS OPERATION
William R. O'Day, Caixa Postal 3784, Rio de Janeiro, Brazil
Filed Feb. 11, 1960, Ser. No. 8,093
18 Claims. (Cl. 75—10)

This invention relates to improvements in the process of the direct reduction of ores by means of heating the ore in an atmosphere of carbon monoxide and/or hydrogen gas. The process includes, but is not confined to, the reduction of iron ores. Reference to ores is understood to be ores in their natural composition or with the admixture of binders, such as heavy petroleum fractions, or with the admixture of carbon for the simultaneous carburization of the iron.

An object of the improvements is to provide a single unit which will efficiently reduce the ore to sponge metal and, if desired, will perform the complete transformation of ore to metal, including reduction, melting, and the admixture of any desired alloying elements.

A further object of the improvements is to provide a method of reducing ore not subject to the usual sticking and sintering difficulties of present practice.

Direct reduction iron, or sponge iron, is a metallic product obtained by the reduction (removal of combined oxygen) of iron ore at a temperature below the fusion point of the iron. It is a product which does not contain the impurities absorbed by the iron in the fusion zone of the blast furnace. In direct reduction practice, this subsequent melting is done in an electric furnace, out of contact with the contaminating elements.

Direct reduction is, in itself, a simple reaction. It requires only a certain amount of heat, easily obtained, plus a reducing atmosphere which can be carbon monoxide, hydrogen, or any mixture of the two.

The most convenient processes, owing to the short reaction time necessary and therefore the relatively high production in relation to investment, are those in which the ore is charged into a closed reaction vessel and a preheated reducing gas is circulated through the ore bed, furnishing at the same time the heat necessary for the reaction and the reducing atmosphere. This method is typified in the "fluid bed" processes, essentially a boiling of the ore fines caused by the velocity of the gas passing through the ore bed.

The difficulties encountered in the operation of this type of reduction system arise from the tendency of reduced ore fines, at reduction temperatures, to adhere to any surface, such as the walls of the reduction vessel, with tremendous tenacity, and to sinter into a solid block, making the removal of the finished material difficult.

This characteristic was amply demonstrated in experiments conducted by the U.S. Bureau of Mines station at Minneapolis, Minnesota, during the investigation of a fluid bed process in which the ore fines were fluidized with hydrogen preheated to 585° C.

Bureau of Mines personnel reported:

"The oxide was fluidized easily, but as deoxidation increased a greater velocity of hydrogen was needed to fluidize the charge until a condition was finally reached in which no amount of hydrogen would produce satisfactory fluidization."

The experiment demonstrates the tendency of reduced ore fines to sinter together, forming a mass sufficiently porous to permit the passage of the reducing gases, however a solid mass which, in the processes which demand that the charge remain in a loose, granular state for discharge, may necessitate the dismantling of the equipment for the removal of the reduced ore. Difficulty began at 54 percent reduction. As the commercial product requires a reduction of at least 90 percent, the pilot installation was abandoned.

Another problem in the production of sponge iron arises from the fact that the reduction, or deoxidation, is reversible at high temperature. The product, deoxidized at a relatively high temperature, must be cooled in a reducing atmosphere, otherwise it is subject to rapid reoxidation. In general, present systems incorporate some form of cooling chamber where the reduced product is held in a reducing atmosphere until it cools to a temperature of about 100° C.

Furthermore, all of the present processes produce sponge iron, an intermediate product which requires reheating and fusion to be used in the form of ingots.

Finally, present processes, to be economically practical, require large installations, necessitating investments of from $2,000,000 to $20,000,000, depending on the process. None offers a process applicable to large or small installations with the same relative degree of efficiency, as does the present invention.

The process described below has for its purpose the solution of the problem cited above.

The process is applicable to iron ore as well as to many non-ferrous ores.

The process will operate with ore of any size, but preferably with ore under ½ inch, as the reaction is more rapid.

The process will operate with hydrocarbons of any nature for the production of the reducing atmosphere. Coal, charcoal, or coke fines which are screened and rejected in the operation of conventional blast furnaces are ideal materials for this purpose.

The process solves the problems of adherence, sintering, and reoxidation, as well as the necessity of a subsequent heating and fusion in other electric furnace installations by melting the reduced sponge iron in the vessel where the reduction takes place, economizing further by the utilization of the heat of the reduction phase in the fusion phase.

The process can be applied to installations of any size. Capacity can be increased, with the same relative efficiency, by the simple addition of more units.

Finally, the process offers in a single unit, by the simple addition of carbon and/or alloys to the pure iron in the fusion phase, an installation capable of producing superior iron and steel to that produced by most conventional equipment.

These and other new and useful objects may be attained by the present invention, which, for its better comprehension, will be described with reference to the attached drawings, in which:

FIGURE 2 is a front view of a reduction chamber;

FIGURE 3 is a cross-sectional view taken upon section line 3—3 of FIGURE 2, looking in the direction of the arrows;

FIGURE 4 is a cross-sectional view taken on section line 4—4 of FIGURE 3 looking in the direction of the arrows;

FIGURE 8 is a vertical cross-sectional view with parts in elevation of the carburetor set shown at D and E in FIGURE 1;

FIGURE 9 is a cross-sectional view taken upon section line 9—9 of FIGURE 8 looking in the direction of the arrows;

FIGURE 10 is a cross-sectional view taken upon section line 10—10 of FIGURE 8 looking in the direction of the arrows;

FIGURE 11 is a vertical sectional view of a dump bottom charging bucket for charging a reduction chamber with ore, and FIGURE 12 is a bottom view of the bucket shown in FIGURE 11.

Figure 1:
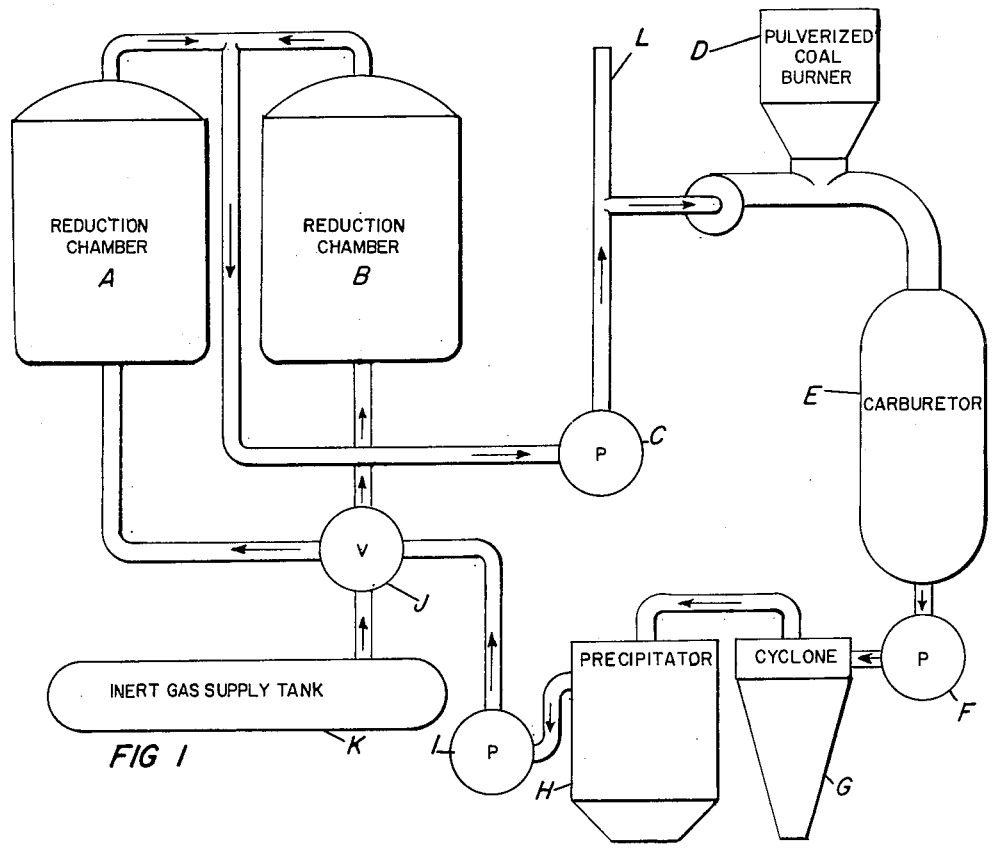
FIGURE 1 is a diagrammatic view showing the installation in its entirety.

FIGURE 1 shows the cycle followed by the reduction gases. A and B are reduction chambers, heated by induction, for the treatment of the ore. C is a circulation pump. D is a modified pulverized-coal burner and E is a carburetor for the regeneration of the reducing gas. F is a circulation pump. G is a cyclone for the removal of ash from the regenerated gas and H is an electrostatic precipitator for the removal of ash. I is a circulation pump. J is a fixed sequence gas control valve. K is a supply tank for inert gas, for example $CO_2$. L is a line for the removal from circulation of the excess gas compulsorily produced in the carburization of the oxygen absorbed from the ore. This partially spent gas can be used for the preheating of the subsequent ore charge. Alternatively, this line can be connected at a point after precipitator H, if a gas of higher heat value is desired.

Chambers A and B are shown in detail in FIGURES 2, 3 and 4. The chambers A and B are mounted by means of the trunnions 10 on any suitable mounts. The cover 12 with a gasket 14 interposed is secured to the body 15 by means of swing bolts and lugs 16. Each chamber is provided with an interior casing 17 spaced from the body 15 and in such spacing are positioned the induction coils 18. The source of energy for the induction coils 18 is not shown, the technique being known. It consists of a high frequency generator such as is generally used in connection with high frequency coreless induction melting furnaces, with the usual condensors and control accessories.

The inlet for the reduction gases is shown at 19 and the outlet slot at 20. A sloping external duct 21 leads from the slot 20 to the outlet 22 located in one of the trunnions 10 while the inlet conduit 23 to the inlet 19 extends through the other trunnion.

Figures 5, 6:
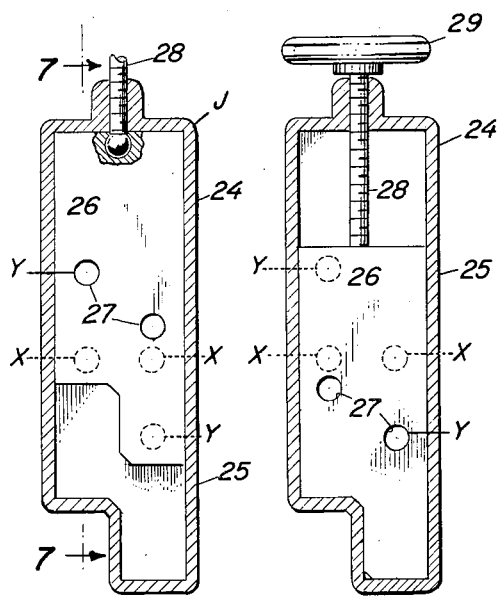
FIGURE 5 is a cross-sectional view of a fixed sequence gas control valve.
FIGURE 6 is a similar view of the gas control valve shown in FIGURE 5 in another position.
Figure 7:
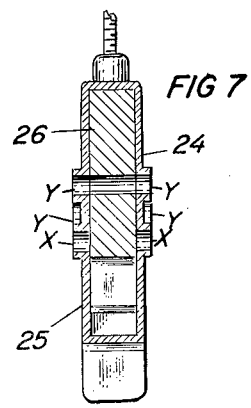
FIGURE 7 is a vertical cross-sectional view taken upon section line 7—7 of FIGURE 5 looking in the direction of the arrows.

A fixed sequence gas control valve 24 is shown in FIGURES 5, 6 and 7. Openings X, X are entrance and exit ports for circulating an inert gas through the reduction chambers. Openings Y, Y are entrance and exit ports for circulating the reducing gas through the reduction chambers. The valve shown in FIGURES 5, 6 and 7 is merely illustrative. There are many types available for accomplishing the function sought. As shown the valve comprises a casing 25 containing the valve block 26 having the apertures 27 therein which when moved by the threaded stem 28 fixed to the valve block 26 and threaded in the casing 25 will bring the opening 27 in alignment with the openings X, X or Y, Y as desired. The stem 28 is fixed to the wheel 29 so that the valve may be manually operated. It is also obvious that if desired the valve may be automatically time controlled.

The carburetor set, D and E of FIGURE 1, are shown in detail in FIGURES 8, 9 and 10. This carburetor is for the regeneration of the recirculated reduction gases. As the gases pass through the heated ore bed in the reduction chamber, part of the CO is converted to $CO_2$ and part of the $H_2$ is converted to $H_2O$, due to the absorption of oxygen from the ore. The pulverized-coal burner, D in FIGURE 1, is modified in that the returning gases enter the unit at what would normally be the primary air supply. Powdered carbon is injected by this apparatus into the gas stream, which carries the carbon into the carburetor E of FIGURE 1 where the baffles 30, heated to incandescence, decompose the carbon, converting the gases back to CO and $H_2$. The carburetor, a vertical section of which is shown in FIGURE 8, consists of a column of short, metal cylinders 31, the center cavity of each cylinder being partially closed by a diagonal surface forming the baffle 30. These diagonals alternate in direction, as shown in FIGURES 8, 9 and 10. This column of cylinders is surrounded by an induction heating coil 32. As shown in FIGURE 8, the conduit 33 coming from the pulverized coal burner D is enlarged at 34 forming a casing for the metal cylinders 31. An outer casing 35 surrounds and is spaced from the casing 34 and the induction coils 32 are located in the space between casing 34 and casing 35. At the lower end of casing 34 conduit 33 returns to original size as shown at 36. Connection to the source of power is by the usual means. The regenerated gas carries the ash out of the carburetor, through cyclone G and electrostatic precipitator H, where the ash is removed, the clean gas circulating once more through the ore bed.

FIGURE 1 represents the flow sheet when charcoal fines are used as a carbon source, as no sulphur removal is necessary. In the case of coal fines or coke breeze, a limestone column is added for sulphur removal. If a liquid or gaseous hydrocarbon is used, the pulverized-coal unit is replaced by a simple nozzle.

FIGURES 11 and 12 show in detail the drop-bottom bucket for charging the ore into the reaction chambers. FIGURE 11 is a vertical section of the bucket and shows the disposition of the two sizes into which the ore has been previously separated. FIGURE 12 is the bottom view.

The bucket 37 is provided with a bale 38 and at the bottom has the butterfly doors 39 which may be automatically controlled by means not shown or operating manually. The coarser particles of the ore 40 are charged at the bottom while the finer particles 41 are located above.

In the operation of this process, the ore, as received, in sized by means of a trommel or similar device, into over ½ inch, plus ¼ minus ½, and minus ¼ inch. Over ½ inch is recrushed. The other two sizes are stored separately.

Sufficient plus ¼ ore to form a bed at the bottom of the reduction chamber about 40 cm. deep and sufficient minus ¼ to fill the balance of the chamber are preheated separately to approximately 1000° C. This may be done in any convenient heater.

The preheated ore, with the larger material at the bottom, is loaded into the drop-bottom charging bucket, as shown in FIGURE 11. The bucket is lowered into one of the reduction chambers, for example "A," and the bottom released. As the bucket is raised, this deposits the larger size ore on the bottom of the chamber and the fines substantially on top. The purpose of this is two-fold: to provide fairly open channels for the dispersal of the entering gas, and to bring the larger size ore in contact with the fresh reducing gas first, so that reduction will be more or less even throughout the ore bed.

The chamber having been charged, the gasketed cover of the unit is closed and bolted.

At this time the fixed-sequence gas control valve 24 is opened. The valve in opening, opens first to the inert gas ports X, X, expelling the air in the chamber and replacing it with the inert gas. As the valve continues opening, the inert gas is closed off and inflammable reduction gases are circulated through ports Y, Y.

This reduction phase continues for about 60 minutes. During this time the induction coil surrounding the chamber may be fed a small amount of power to help the hot reduction gases maintain the temperature of the ore at about 1000° C., or, by increasing the temperature of the gases leaving the carburetor, the temperature may be maintained solely by the heat of the reduction gases.

At the end of this reduction phase, the gas control valve is closed, again passing ports X, X, at which time the CO remaining in the chamber is flushed out by the inert gas. This feature is convenient as it prevents the contamination of the working area when the unit is opened.

At this time, chamber B having been charged with preheated ore and closed, as above, the reducing gas is circulated through chamber B. At the same time, full power is supplied to chamber A, the temperature raised by the induction heating from the existing 1000° C. to approximately 1600° C. and the sponge iron melted to liquid iron. At this time carbon can be adjusted, alloys added, or recirculation plant scrap remelted. The 60 minutes during which chamber B will be in the reduction phase gives ample time for this fusion and manipulation. Thus we have a melt every 60 minutes.

Concerning the admixture of alloys in induction furnace practice, A. G. E. Robiette states in "Electric Melting and Smelting Practice," Chas. Griffin, London 1955:

"The most outstanding feature possessed by the coreless induction furnace is in the stirring of the charge by electro-dynamic effect. This phenomenon . . . is directly responsible for the homogeneity in complex alloy steels which has been accepted as an attribute of induction melting.

"As a test of the effectiveness of the circulatory motion, a charge of high-speed steel was made by placing ferro-tungsten in the bottom of the furnace lining and adding the lighter mild steel scrap on top. An analysis of the resulting ingot showed no variation in tungsten content from top to bottom, no mechanical stirring having been used."

If charcoal fines are used in the carburetor for the regeneration of the gas, no sulphur is present in the gas produced. However, if coke breeze or coal fines are used a simple limestone tower will remove the sulphur contained in these gases. This variation is not shown, as the technique is well known.

If desired, the reduction phase may be conducted under pressure, thus accelerating the reaction, by the simple expedient of restricting the exit opening 20 of the reduction chamber.

Among the advantages offered by the use of this process are the following:

The low cost of the reduction chamber permits the installation of multiple units fed from a central power supply. The power source, consisting of a high frequency current generator, capacitors and timing controls, can be kept in continual service by shifting from unit to unit.

By the control of three variables: frequency, power, and time, induction heating can produce and maintain any temperature, including melting temperatures. Temperatures can be held to close tolerances.

Ample means are available and should be provided to protect the system against overload, short circuit, failure of water supply, etc.

By effecting more rapid heating, thus diminishing the time during which the reduced iron is in contact with carbon, metal of extremely low carbon content can be produced, using the more readily available carbon monoxide gas.

The induction heater, requiring no oxygen for combustion, lends itself to excellent thermal insulation and efficient furnace design. The short, simple gas cycle reduces heat losses to a minimum.

Ore fines and sponge iron, having a relatively high electrical resistance, are ideal materials for induction heating. Hematite ore fines, after the first few minutes of reduction, become sufficiently magnetic to heat by the induction field.

Plant space required is small in comparison with any other ore-to-steel combination.

The process incorporates, in a single unit, the advantages of the high-purity sponge iron/electric furnace combination plus economies, flexibility and quality that cannot be obtained by the use of these as separate equipment.

I claim:

1. A process of direct reduction and fusion in a continuous operation by means of induction heating, applicable to both ferrous and non-ferrous ores comprising preheating the ore, reducing the ore by circulating a reducing gas through the ore within a closed chamber, the preheated gas furnishing both the reducing atmosphere and the reduction temperature, recircling the reducing gas leaving the reduction chamber, after regeneration and cleaning of entrained ash, until reduction is complete, and without interrupting the operation expelling the residual reduction gases by inert gas and melting the reduced ore to liquid metal by increasing the existing reduction temperature to fusion temperature.

2. A process as set forth in claim 1 wherein there is a simultaneous execution of the two phases of reduction and fusion within the same system, one charge being reduced in an atmosphere of reduction gas while the other charge, already reduced, is melted in an atmosphere of inert gas.

3. A process as set forth in claim 1 wherein the ore is screened to a size appropriate for tis reduction, and in the case of iron ore, preferably under ½ inch.

4. A process as set forth in claim 1 wherein the temperature of reduction is maintained by the temperature of the regenerated gases, and the temperature of the charge may be increased by increasing the temperature of these gases by increasing the temperature of the induction heated baffles in the carburetor.

5. A process as set forth in claim 1 wherein the reduction is effected under pressure by the partial restriction of the exit opening of the reduction chamber.

6. A process as set forth in claim 1 wherein the time is reduced during which the already reduced portion of the ore is in contact with carbon by increasing the velocity of heating the ore.

7. A process as set forth in claim 1 wherein the carbon is adjusted in the fusion phase, and alloys are added at this time.

8. A process as set forth in claim 3 wherein the ore under treatment is charged with the larger size between ¼ and ½ inch, at the bottom, and the smaller size, under ¼ inch, above this larger size.

9. A process as set forth in claim 4 wherein an induction coil surrounds the reduction chamber as means of increasing the temperature of the ore charge.

10. An installation for direct reduction and fusion of ores comprising a hermetically closable chamber enclosed in induction coils for the heating of an ore charge, a fixed-sequence gas control valve operating step-by-step to expel the air contained in the charge by substituting an inert gas received from a supply tank, circulate the reducing gas used in the reduction phase, reestablish within the chamber an inert atmosphere by the expulsion of the residual reducing gas, for the realization of the fusion phase, a regenerating set for the gas used in the reduction, a cyclone and precipitator for the removal of entrained ash, insulated tubing connecting said elements and pumps for the circulation of the gases.

11. An installation as set forth in claim 10 wherein two chambers are provided operating under identical conditions, and one will be in the reduction phase, while at the same time the other, with its charge already reduced, will be in the fusion phase.

12. An installation as set forth in claim 10 wherein the fixed-sequence gas control valve has, below, openings for the entrance and exit of inert gas for the establishment of an inert atmosphere and, above, entrance and exit openings for the circulation of reducing gas through the reduction chamber.

13. An installation as set forth in claim 10 wherein the gas regenerating set used in the reduction comprises a modified pulverized-coal burner which injects carbon fines into the returning stream of partially spent gas, and a carburetor which receives these gases charged with carbon fines and regenerates the gases by decomposing the entrained carbon.

14. An installation as set forth in claim 10 wherein a limestone tower is added to the system for the removal of sulphur.

15. An installation as set forth in claim 10 wherein hydrocarbons are used for the regeneration of the reducing gases and the pulverized-coal burner is substituted by a nozzle or suitable atomizer.

16. An installation as set forth in claim 10 wherein gaseous hydrocarbons are used for the regeneration of the reducing gases and the pulverized-coal burner is substituted by a nozzle or suitable atomizer.

17. An installation as set forth in claim 10 wherein liquid hydrocarbons are used for the regeneration of the reducing gases and the pulverized-coal burner is substituted by a nozzle or suitable atomizer.

18. Installation as set forth in claim 13 wherein the carburetor is provided internally with diagonally opposed baffles and surrounded by an induction heating coil.

References Cited in the file of this patent
UNITED STATES PATENTS

| | | |
|---|---|---|
| 1,964,680 | Stalhane et al. | June 26, 1934 |
| 2,509,921 | Gwynn | May 30, 1950 |
| 2,653,088 | Pike | Sept. 22, 1953 |